Nov. 2, 1926.
SUBSTITUTE FOR MISSING XR
T. W. CASE
1,605,527
REPRODUCING APPARATUS
Filed August 8, 1924    2 Sheets-Sheet 1
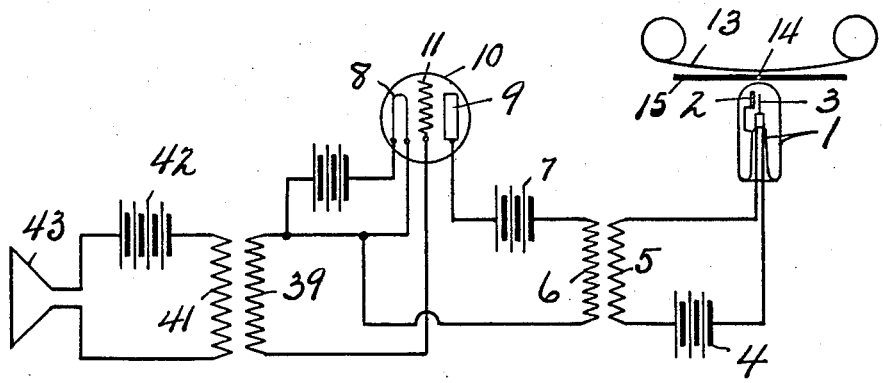
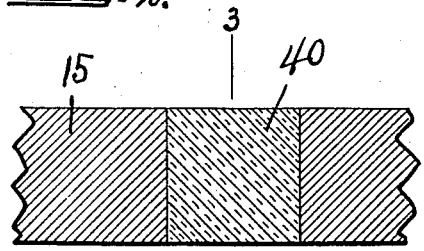
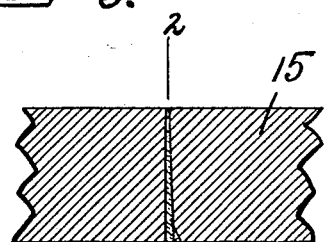
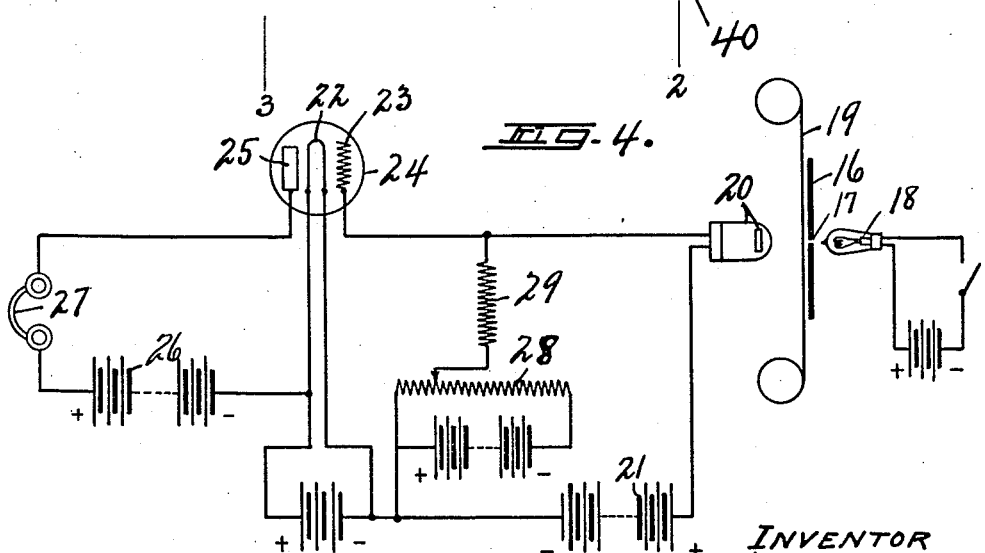

Nov. 2, 1926.  T. W. CASE  1,605,527
REPRODUCING APPARATUS
Filed August 8, 1924   2 Sheets-Sheet 2
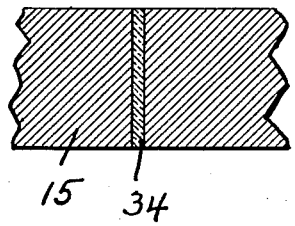
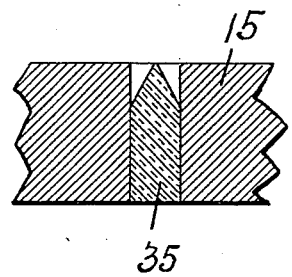
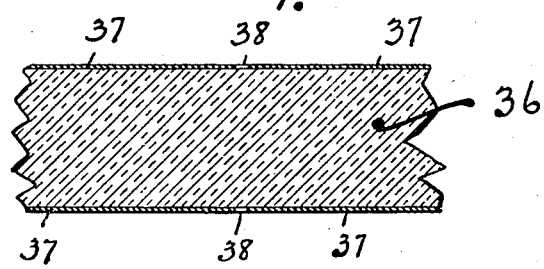
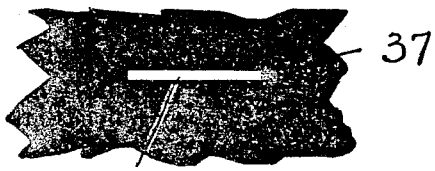
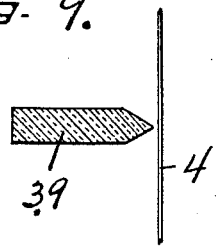
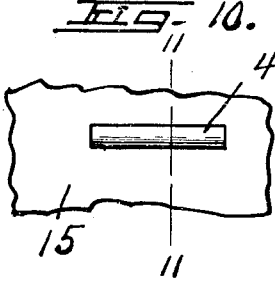
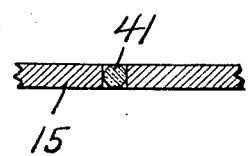
WITNESS
H. V. Hurst
INVENTOR
T. W. Case
BY Denison Thompson
ATTORNEYS Patented Nov. 2, 1926.

1,605,527

UNITED STATES PATENT OFFICE.

THEODORE WILLARD CASE, OF AUBURN, NEW YORK, ASSIGNOR TO CASE RESEARCH LABORATORY INCORPORATED, OF AUBURN, NEW YORK, A CORPORATION OF NEW YORK.

REPRODUCING APPARATUS.

Application filed August 8, 1924. Serial No. 730,994.

This invention relates to a certain new and improved apparatus for taking, printing or reproducing a film record, and is particularly designed for use in producing a film record of light variations as caused by electrical variations, preferably corresponding to sound wave variations, as for instance, articulate sound waves.

In apparatus of this character for producing a film record of light variations, it has been customary to move the film past a small printing slot in a wall disposed between the film and the source of light, and it is essential that the film move past the slot in tight contact with the said wall so that only the portion of the film directly in front of the slot is exposed to the light emanating from the source.

Considerable difficulty has been experienced in producing an accurate, clear and exact film record, and also in reproducing accurately the original sound from a record, due to the fact that dust, film material, or foreign matter collects in the slot, perhaps is scraped off the film record as it passes by the edge of the slot, and partially obstructs the slot which is extremely small, as for illustration, .0015 of an inch in width, and .1 of an inch in length, and the result is that the film record produced is somewhat unsatisfactory because of this obstruction of the slot, and for the same reason a reproduction of even a perfect film record is unsatisfactory, and the object of this invention is the production of an apparatus retaining all the advantages of present similar apparatus, but in which this disadvantage is avoided.

Other objects and advantages relate to the details of the structure for effecting the main object of this invention, all as will more fully appear from the following description, taken in connection with the accompanying drawings, in which:—

Figure 1 is a diagrammatic illustration of an apparatus for producing a film record of light variations as produced by electrical varations corresponding to articulate sound waves or musical tones.

Figure 2 is a sectional view lengthwise of the printing slot or the slot past which the film moves in tight relation with the surrounding wall, and is taken on line 2—2, Figure 3.

Figure 3 is a section at right angles to Figure 2 taken on line 3—3, Figure 2.

Figure 4 is a diagrammatic illustration of an apparatus for reproducing sound waves from a film record.

Figures 5, 6, 7, 8, 9, 10 and 11 illustrate other forms which the invention may take. These illustrations are considerably enlarged, and are more or less diagrammatic, and are not intended to accurately illustrate the size of parts.

In a general way, the structure of Figure 1 is the same as that disclosed in my application Serial No. 719,098, filed June 9, 1924, and comprises a lamp —1— having two spaced electrodes —2— and —3— connected in circuit with a source of potential, as battery —4—, and the secondary —5— of a transformer, the primary —6— of which is connected in circuit with a source of potential —7— across filament —8— and plate —9— of a space discharge device —10—, the grid —11— of which is connected in circuit with the filament —8— and the secondary —39— of a transformer, the primary —41— of which is connected in circuit with a source of potential, as battery —42— and a microphone —43—.

In a general way, this structure includes means for varying an electric current in accordance with sound wave variations, and for amplifying such variations, and thereby effecting amplified variations in the lamp —1—, the light emanating from which is adapted to be printed or photographed upon the film —13— moving past the narrow slot —14— in the wall —15—. The wall —15— may be a portion of an enclosure for the film, or a portion of an enclosure for the lamp, it being essential however, that the film moves past the slot —14— in tight relation with the wall —15—.

In order to retain the advantages of the present apparatus and still eliminate the possibility of the slot —14— becoming obstructed by dust or other matter, I may form the slot through the wall —15— so that it tapers slightly toward the side on which the film —13— moves, as best illustrated in Figure 3, or it may be of uniform width throughout as illustrated in Figure 5.

For illustrative purposes, a satisfactory slot is of .0015 of an inch in width at the side of the wall —15— upon which the film —13— moves. At the opposite side of the wall or the side upon which the lamp —1— is positioned, the slot may be .002 of an inch in width and the length of the slot may be .1 of an inch. In the slot so formed, as illustrated in Figure 3, I place a transparent member —40— preferably a quartz wedge, altho various other material may be used adapted to fit the slot described, and this quartz wedge —40— may be secured in the slot in any suitable manner, as for instance, by the use of Canada balsam. I have found that a quartz sheet, wedge, or other shaped piece will transmit practically all the light which it receives as a result, it would seem, of interior reflection, and for this reason it is peculiarly adapted for my purpose.

It will appear that with this structure, the passage of the light through the slot to the film is substantially unimpaired while the quartz wedge eliminates the possibility of dust and foreign material collecting in the slot, and thereby obstructing the passage of the light.

In Figure 4 the wall —16— is constructed in the same manner as the wall —15— and the slot —17— contains a quartz wedge as disclosed in Figures 1, 2 and 3. In this construction, the light from a suitable source, as lamp —18— passes through the slot —17— which contains the transparent substance as preferably quartz, and then passes through the film —19— which constitutes the sound record and strikes the light sensitive cell —20— which may be formed of any suitable material that varies its resistance in accordance with the intensity of the light to which it is subjected, as for illustration, selenium.

The light cell —20— may as shown, be connected in circuit with a source of potential as the battery —21— across the filament —22— and grid —23— of a space discharge device —24—, the filament —22— and plate —25— of which are connected in circuit with a source of potential, as battery —26— and a translating device, as the telephone receivers —27—.

For the purpose of compensating for variations in light cells as manufactured, or other varying conditions, a potentiometer —28— and a fixed resistance —29— may be placed across the filament and grid of the electron discharge device —24—.

Figure 5 illustrates a structure similar to Figure 3 except that the quartz member —34— for transferring the light from the lamp to the film is of uniform thickness throughout.

Figure 6 illustrates a structure similar to Figure 5 except that the quartz piece or sheet —35— is made of any desired width, but is tapered at one end so as to present to the film an edge of the desired width to conform perhaps with the ordinary width of the slot used at present which as before stated, is approximately .0015 of an inch in width and .1 of an inch in length.

In Figure 7 a different form of structure is illustrated in that a slot or other means for supporting the light transferring strip or sheet of quartz is omitted, and the wall or barrier —36— between the lamp and the film may be formed of transparent material, as quartz, and all of the surface of either one or both sides of the wall or barrier except a portion of a size substantially equal to the size of the slot now in use are rendered opaque by painting the surface at —37— or by any other suitable means or method. The transparent space —38— left for the passage of light is illustrated in Figure 8 and conforms as will be obvious, to the usual printing slot.

In Figure 9 a structure similar to that illustrated in Figure 6 is shown, except that no means for supporting the light transferring sheet or piece of quartz —39— is illustrated, and this for the reason that any suitable means of support may be provided as one of the essential features of this invention resides in a quartz sheet or piece for transferring light from a source to a sensitive element, and as illustrated in Figure 9, the film may be moved past the tapered end of the quartz piece in close relation with the edge.

In Figures 10 and 11 a further modified form of structure is shown in that the slot in the camera wall or in the barrier between the source of light and the film or sensitive element is filled with a cylinder —41— of transparent material which extends lengthwise of the slot. In this construction, the slot may be made considerably larger than the usual printing slot and the cylinder of transparent material will reduce the width of the transferred light to the size desired for printing upon the film, and the extent of such reduction will depend upon the curvature of the cylinder.

Obviously in the structure last illustrated, the light transferring member need not be in the form of a perfect cylinder, but may be of such form and of such curvature as will produce a line of light of the desired width.

Altho I have shown and described various constructions as illustrative of embodiments of my invention, it will be apparent from the variety of the disclosure that I do not desire to restrict myself to the details of any of the structures disclosed except where the same are specifically set forth in the claims hereto appended.

I claim:

1. An apparatus for producing sound pictures on or reproducing sound pictures from a film comprising a wall having a slot therein past which a film record element is adapted to move in close relation, and a transparent solid secured in the slot and substantially filling the same and constituting the sole means for transferring light through the slot to the record element.

2. In an apparatus of the class described, the combination with a wall having a narrow slot past which a film is adapted to move in close relation with the wall, of a quartz filling in said slot.

3. In an apparatus of the class described, the combination with a wall having a narrow wedge-shaped slot past which a film is adapted to move in close relation with the wall, of a quartz wedge in said slot.

4. In an apparatus of the class described, a wall having a narrow slot therein, a film disposed upon one side of said wall moving past the slot in tight relation with the wall, a source of light upon the opposite side of the wall and a quartz wedge in said slot through which light from said source passes in reaching the film.

5. In an apparatus of the class described, a wall having a narrow slot therein, a sensitive strip upon one side of said wall adapted to move past said slot in tight relation with the wall, an object upon the side of said wall opposite the sensitive strip and to which the sensitive strip is exposed through said slot, and a quartz filling in said slot.

6. In an apparatus of the class described, a wall having a narrow wedge-shaped slot therein, a sensitive strip upon one side of said wall adapted to move past said slot in tight relation with the wall, an object upon the side of said wall opposite the sensitive strip and to which the sensitive strip is exposed through said slot, and a quartz wedge secured in said slot.

7. In an apparatus of the class described, the combination with a wall having a wedge shape narrow elongated slot therein past which a sensitive element is adapted to move, of a wedge shape piece of quartz fitting the slot, and secured therein, and adapted to transfer light to the sensitive element.

8. In an apparatus of the class described, the combination with a wall having a slot therein past which a sensitive element is adapted to move, of a quartz piece substantially fitting the slot and secured therein, and adapted to transfer light to the sensitive element.

In witness whereof I have hereunto set my hand this 23rd day of July, 1924.

THEODORE WILLARD CASE.